(12) United States Patent
Birke et al.

(10) Patent No.: US 10,048,740 B2
(45) Date of Patent: Aug. 14, 2018

(54) CONTROLLING POWER CONSUMPTION

(71) Applicant: International Business Machines Corporation, Armonk, NY (US)

(72) Inventors: Robert Birke, Kilchberg (CH); Yiyu L. Chen, Thalwil (CH); Antonius P. Engbersen, Feusisberg (CH); Martin L. Schmatz, Rueschlikon (CH); Cheng Wang, University Park, PA (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 14/814,903

(22) Filed: Jul. 31, 2015

(65) Prior Publication Data

US 2017/0031416 A1    Feb. 2, 2017

(51) Int. Cl.
*G06F 1/32* (2006.01)

(52) U.S. Cl.
CPC ........... *G06F 1/324* (2013.01); *Y02D 10/126* (2018.01)

(58) Field of Classification Search
CPC .......... G06F 1/324; G06F 1/32; G06F 1/3225; G06F 1/3275; Y02B 60/1217
See application file for complete search history.

(56) References Cited

U.S. PATENT DOCUMENTS

| | | | |
|---|---|---|---|
| 8,271,809 B2* | 9/2012 | Bose | G06F 11/3006 713/300 |
| 9,128,721 B2* | 9/2015 | Dorsey | G06F 1/324 |
| 9,600,392 B2* | 3/2017 | Hanson | G06F 11/3466 |
| 2008/0082844 A1* | 4/2008 | Ghiasi | G06F 1/3203 713/323 |
| 2009/0049314 A1 | 2/2009 | Taha et al. | |
| 2010/0023653 A1 | 1/2010 | Rozen et al. | |
| 2013/0232346 A1* | 9/2013 | Wu | G06F 1/3228 713/300 |
| 2014/0068285 A1 | 3/2014 | Lee et al. | |
| 2014/0101420 A1* | 4/2014 | Wu | G06F 1/3206 713/1 |
| 2014/0215241 A1* | 7/2014 | Yoon | G06F 1/324 713/322 |

* cited by examiner

*Primary Examiner* — Fahmida Rahman
(74) *Attorney, Agent, or Firm* — Michael O'Keefe

(57) ABSTRACT

A computing system comprises one or more multicore processor(s) comprising a set of multiple processing units each operable at a variable frequency, and a main memory operable at a variable frequency. A feedback controller is configured to control the frequency of each processing unit of the set and the frequency of the main memory dependent on a measure representative of a current performance of an application running on one or more of the multiple processing units of the set.

17 Claims, 3 Drawing Sheets

CONTROLLING POWER CONSUMPTION

BACKGROUND

The present invention generally relates to a computing system and to a method for controlling power consumption of a computing system including a multicore processor.

Multicore processors are known to be operated under a dynamic voltage and frequency scaling (DVFS) regime.

SUMMARY

According to an aspect of the invention, a computing system is provided. The computing system includes one or more multicore processors. Each multicore processor includes a set of multiple processing units and a main memory. Each of the multiple processing units is operable at a variable frequency and the main memory is operable at a variable frequency. A feedback controller is provided. The feedback controller is configured to control the frequency of each processing unit and to control the frequency of the main memory. The feedback controller controls these frequencies based on a measurement which is representative of a current performance of an application running on one or more of the multiple processing units of the set.

According to another aspect of the present invention, a method is provided for operating a computing system. The method may include one or more multicore processors. Each of the multicore processors includes a set of multiple processing units, a main memory and a power supply. Each of the multiple processing units is operable at a variable frequency and the main memory is operable at a variable frequency, and comprising a power supply providing power at least to the one or more multicore processors and to the main memory. The method comprising for each application of a set of applications co-running on the set of processing units providing a measure representative of a current performance of the respective application, providing a measure representative of the current power supplied by the power supply, and controlling the frequency of each processing unit of the set and the frequency of the main memory dependent on the performance measures of the applications of the set and the power measure.

In an embodiment, the method may include one or more of the following features: operating a model of power consumption by determining a consumed power dependent on the frequencies of each processing unit and dependent on the frequency of the main memory; operating a model of performance measure for each application by determining the application specific performance measure dependent on the frequencies of the processing units the application is supposed to run on and the frequency of the main memory; determining the frequency to control each processing unit with in a next step and determining the frequency to control the main memory with in a next step by minimizing a weighted sum of power consumption and performance degradation per application wherein the performance degradation per application is defined as a deviation of the performance measure from the target performance; determining the frequency for each processing unit and the frequency of the main memory by applying a Model Predictive Controller.

According to another aspect of the present invention, a computer program product is provided including a computer readable medium having computer readable program code embodied therewith, the computer readable program code including a computer readable program code configured to perform a method according to any of the previous embodiments.

Embodiments described in relation to the aspect of an apparatus shall also be considered as embodiments disclosed in connection with any of the other categories such as the method, the computer program product, etc.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

DETAILED DESCRIPTION

Figure 1:
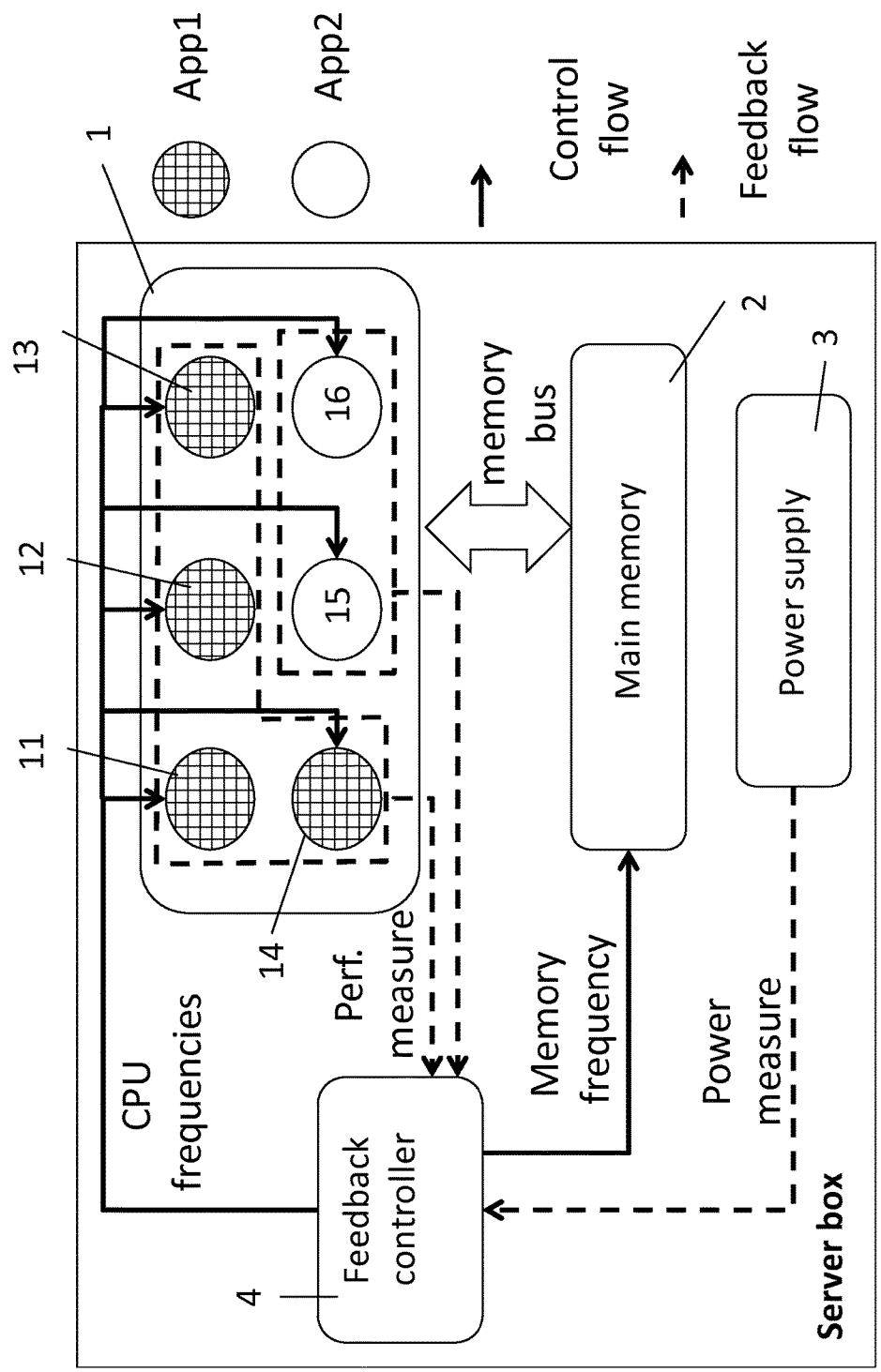
FIG. 1 illustrates a computing system according to an embodiment of the present invention, in form of a block diagram.

As an introduction to the following description, it is first pointed at a general aspect of the invention, concerning a computing system comprising a multicore processor comprising a set of multiple processing units each operable at a variable frequency.

Multicore processors are known to operate their individual processing units at different frequencies, this processing regime is also known as Dynamic Voltage and Frequency Scaling (DVFS).

Inclusion of a main memory in this processing regime and controlling the frequencies of the individual processing units and the frequency of the main memory by a common processing regime can reduce system power consumption, while still meeting performance metrics of individual applications running on the processing units. The individual processing units can also be referred to as cores. In an embodiment, the common control regime is represented by a feedback controller.

A computing system can be, for example, a data center, a mainframe computer, a server computer, a personal computer, a portable computer including a smartphone, a tablet, or other devices, and at least one multicore processor is included with the frequencies of the individual processing units being variable, and in particular the frequency can be individually controllable and adjustable. In a preferred embodiment, the individual processing units, for example, the cores, are included in a common semiconductor chip each covering a dedicated area of the semiconductor chip. In another embodiment, a multi-chip processor is provided having multiple chips with each chip containing at least one processing unit. From an application level these multiple processing units may appear as a common processor. The set of processing units not necessarily encompasses all processing units of the processor. However, each processing unit of the set includes a variable clock, also referred to as frequency.

The main memory is operable at a variable frequency. In other words, the main memory can be operated at different clock rates. The entire main memory may be operated at a common but variable clock. There may be cases where the main memory systems, e.g. including memory sub-banks, are each operable at a different clock with each clock being variable. The present embodiment encompasses a single clock main memory. The main memory itself may e.g. be a volatile memory or a non-volatile memory, made in a solid state technology or in a non-solid state technology, or other types of memory.

Power management is important to computing systems, examples of computing systems include enterprise computing systems such as data centers and mobile computing systems such as smartphones. The multicore processor, otherwise known as the processor, also referred to as central processing unit (CPU), contributes significantly to the system power consumption. The main memory, including memory subsystems, also significantly contributes to the system power consumption, for example, the power used by the associated computing system.

Scaling and adjustment of the main memory clock frequency may be independent of the scaling and adjustment of the processor clock frequency. In a preferred embodiment, the scaling and adjustment of the main memory clock frequency is coordinated with the scaling and adjustment of the processor clock frequency. This coordination may achieve additional power savings while maintaining performance targets. The present invention may encompass the application of a common DVFS to the processor, including its individual cores, as well as to the main memory.

In particular, when a computing system is configured capable of running a set of applications in parallel on different cores of the computer system, significant power savings can be achieved while the performance of the individual applications can be maintained, or at least maintained within minimum performance targets provided per application.

To determine the desired frequencies of the individual processing units and the frequency of the main memory, it is preferred to use one or more performance measurements per application. The aggregate performance measurements may also be referred to as performance metrics. A performance measurement can for example be a response time. For instance a Web server may have a performance measurement of a response time for building a new web page or may be an instructions per clock cycle (IPC) value. The IPC also denotes a latency of the subject application. The higher the IPC value indicates the faster the application is performed. Other performance measurements, such as maximum delay times can also be used. A performance measurement may be supplied by the subject application, and measured for the underlying cores. The performance measurements may be derived from other measurements available.

A feedback controller is provided for determining and controlling the frequencies of the multiple cores of the set and the frequency of the main memory, dependent on the performance measurements of one or more applications concurrently running on the processor. In this context, "fairness" can be achieved between applications concurrently in a multicore environment, which is not considered when using DVFS for a standalone memory subsystem.

The computing system may include a power supply which supplies power to the multicore processor, the main memory and other components of the computing system. A measurement can be taken representative of the current power supplied by the power supply. The measurement can be the power itself in Watts, a measurement for the electrical energy supplied, or a different measurement. The power measurement may be supplied to the feedback controller, which in turn determines the frequencies of the individual cores and the main memory, collectively referred to as frequencies. The determined frequencies is dependent on the current performance measurement for the one or more applications of the set, and on the current power measurement.

In order to reduce power consumption, the frequencies of the individual cores and the main memory may be reduced and may result in performance degradation of the applications. Alternatively, an increase in the frequencies of the individual cores and the main memory may result in improved performance of the applications and increased power consumption.

A predictive model may be used which to determine the reduction in power consumption when reducing the performance measurement for a first application by x and the performance measurement for a second application by y. The predictive model of the power consumption is dependent on the loads of the individual cores and the load of the main memory. As a measurement representing the load of these individual elements, it is preferred to use the various frequencies of the cores and the main memory, preferably in a linear fashion. In a preferred embodiment, the power consumed by the computing system may be predicted by summing up the power consumption of the cores as a linear function of the frequencies of the cores and the power consumption of the main memory as a linear function of a memory frequency. For example, $$P = A + B^*f_1 + C^*f_2 + \ldots N^*f_N + M^*f_M$$

Where: P is the measure of power consumed by the computer system;
  A is a constant representing, for example, the power consumption of non-CPU and non-memory components supplied by the same power supply,
  B, . . . N and M are coefficients/weights,
  $f_1$ . . . $f_N$ are the individual frequencies/clocks of the N different cores, and
  $f_M$ is the frequency/clock of the main memory.

An application performance model may be used for performance measurements. It is preferred to provide and implement a model of the performance measurement per application which is dependent on the loads of the individual cores on which the subject application runs, and also is dependent on the load of the main memory. As a measurement representing the load of these individual cores, it is preferred to use the various frequencies, preferably in a linear fashion. Hence, an application performance model is provided to approximate a relationship between the performance measurements of the concurrently running applications.

For each application, the cores which are utilized to run the application are specified, and a performance measurement can be predicted. The performance measurement can be approximated by a linear model to demonstrate a relationship between the performance measurement and the core frequencies and the memory frequencies. In a preferred embodiment, the performance measurement for an application may be determined by summing up the power consumption of the cores on which the application runs on as a linear function of the frequencies of these cores and the power consumption of the main memory as a linear function of the memory frequency. For example, $$U_1 = a + b^*f_1 + \ldots g^*f_G + \ldots + M^*f_M$$

Where: $U_1$ is the measure of performance of application app1;
  a is a constant,
  b, . . . g are coefficients/weights, $f_1 \ldots F_G$ are the individual frequencies/clocks of the G different cores the application app1 runs on, $f_M$ is the frequency/clock of the main memory, and M is its associate coefficient/weight.

Specifically, a, b, etc. in the application performance model are different from A, B, etc. in the power consumption model. Preferably, for each of the concurrently running applications, an application performance model is built, preferably with different constants, coefficients/weights per application, and preferably with the frequencies of the different cores utilized per application. Such power consumption models are preferably stored in the computing system.

Finally, in a preferred embodiment, the feedback controller is configured to determine the CPU and the memory frequencies, such a weighted sum of the power consumption and the performance degradation is minimized. This is an optimization problem to be solved. The performance degradation preferably is defined as a deviation of the performance measurement for an application from the target performance which is supplied e.g. by the user. The power consumption as well as the performance degradation can be predicted by the predictive model and the application performance model. Preferably, the performance degradation is determined for each application in the set. The optimization preferably is performed for each application. Preferably, performance targets are respected in such determination of the various frequencies and hence in the solving of the optimization problem. Performance targets—also referred to as targets of performance measures—are considered to be known upfront per application, e.g. in form of a maximum response times allowed.

As a result, CPU and main memory DVFS is applied on a multicore computing system in a synchronized manner, addressing fairness across applications. Application-level QoS is considered.

In the figures, same or similar elements are denoted by the same reference signs.

Referring now to FIG. 1, a computing system in the form of a block diagram is illustrated, according to an embodiment of the present invention. The computing system includes a multicore processor 1 including presently six processing units 11 to 16 in the form of cores. The number of processing units can vary. The processor 1 interacts with a main memory 2 via a memory bus. A power supply 3 supplies power to the power consuming elements of the computing system, including to the processor 1 and to the main memory 2. A feedback controller 4 is provided for controlling a frequency or a clock of each of the individual cores 11 to 16, and for controlling a memory frequency or a clock of the main memory 2. Corresponding control signals are the outputs of the feedback controller 4. The feedback controller 4 receives information from the power supply 3, in particular a measurement representing the power currently supplied by the power supply 3 to the computing system.

In an embodiment, two software applications are concurrently run on the processor 1. The application App1 runs on the cores 11, 12, 13 and 14, while the application App2 runs on the cores 15 and 16. The processor 1 supplies performance information of each application App1 and App2 to the feedback controller 4 as input. For example, the performance measure for each application App1 and App2 is a latency measurement which the subject application presently experiences and is used as the application specific performance measurement.

The feedback controller 4 determines the individual frequencies for the processor cores 11 to 16 and for the main memory 2. These frequencies are dependent on the received current power measurement and the received current performance measurement for the application App1 and the application App2.

Preferably, the feedback controller 4 is designed as a Model Predictive Control (MPC). Using the MPC may guaranty stability and long-term optimality. The feedback controller 4 receives as input a current power measurement representing a system power consumption at a time t and a current performance measurement at the time t for each application. The feedback controller 4 determines the CPU frequency and the main memory frequency as indicated above. A preferred methodology applied in the feedback controller 4 is to predict system power consumption and performance values for an optimization horizon based on the received input measurements. It is preferred to set up a power model that predicts the power consumed by the computing system subject to the parameters to be controlled, for example, the frequencies of the processor cores and the main memory. Preferably, the predicted power measurement results from a summation of the power consumption of the individual cores as a linear function of the frequencies of the cores plus the power consumption of the main memory as a linear function of the memory frequency.

For example, a discrete-time system may be considered, $t=1, 2, \ldots, T$ (e.g., 10 sec as a time slot and T=6), wherein the processor has N cores and S co-running applications. In the power model, the inputs are the frequencies of the cores and the main memory and the output is the predicted system power as a linear function of input frequencies of the cores and the main memory.

In a similar way, future performance values can be predicted by means of a performance model per application. In this context, for each application, the cores the subject application runs on are specified up-front, as well as the kind of performance measure applied, e.g., response time, and targets for the performance measure/s for the subject application, e.g. a maximum response time tolerated for the subject application. It is preferred, for each application, to use a linear model to approximate the relationship between performance metric and CPU and memory frequencies.

For example, the same discrete-time system may be considered as above, $t=1, 2, \ldots, T$ (e.g., 10 sec as a time slot and T=6). The performance model is set up per an application, and the number of cores used by this application is then determined. The performance measurement is specified, for example, response time, and an associated performance measurement target, for example, a maximum response time is defined. In each performance model, the frequencies of the cores running the same application and the frequency of the main memory are the inputs, and the predicted performance measure as a linear function of the frequencies of the cores of the subject application and the frequency of the main memory is the output, for example, a predicted response time.

The feedback controller 4 uses the predicted power measurement and the future performance models to determine optimal frequencies of each of the cores and the main memory, and establishing a balance between power savings and future performance.

Preferably, the feedback controller determines the power consumption and the performance values for the various applications for an optimization horizon, which in the above example, may be e.g., T=6 times 10 sec, equal to 60 seconds. These predictions are based on the current input, i.e. the current power measurement and the current performance measurement, and on the predicted power measurement and the future performance models.

For the next step in time, i.e. t+1, a weighted sum of the system power consumption and a performance degradation is minimized, which results in the frequencies for the cores and the main memory that are to be set in time step t+1. At time step t+1, control actions are applied corresponding to the first time slot t→t+1 in an optimization window, which corresponds to the above optimization horizon. The control actions are transformed into discrete DVFS states while the optimization window then is moved to time t+2.

In a preferred embodiment, a measure representative of the current power P(t) supplied by the power supply at time t may be defined as $$P(t) = P(t-1) + k_f \sum_{s \in S} \Delta F_s(t) + k_m \Delta m(t)$$

Where: $k_f$ and $k_m$ are constants determined empirically,
i.

$$F_s(t) = \sum_{i \in I(s)} f_i(t)$$

is the aggregate CPU frequency for application s,
ii. I(s)={I: core i belongs to application s},
iii. $f_i(t)$ is the frequency of core/processing unit i,
iv. m(t) is the frequency of the main memory, and $$\Delta f_i(t) = f_i(t) - f_i(t-1)$$

$$\Delta m(t) = m(t) - m(t-1)$$

v.
In an embodiment, the performance measure for an application s is defined by an example of a first order model:

$$W_s(t) = a_s W_s(t-1) + b_s \Delta m(t) + c_s \Delta F_s(t)$$

Where: $a_s$, $b_s$ and $c_s$ are constants determined empirically, and $$W(t) = (W_1(t), \ldots, W_s(t))^T$$

is the performance metrics for all applications.

In such example, the minimized weighted sum of system power consumption and performance degradation is determined by $$\min_{\substack{\Delta m(t+i), \\ \Delta F_s(t+i)}} \sum_{i=1}^{T} \left\{ P^2(t+i|t) R(i) + \left\| \frac{W(t+i|t)}{W^{ref}} - 1 \right\|_2^2 Q(i) \right\}$$

Where: R(i) and Q(i) are weights of power saving versus performance degradation cost.

Figure 2:
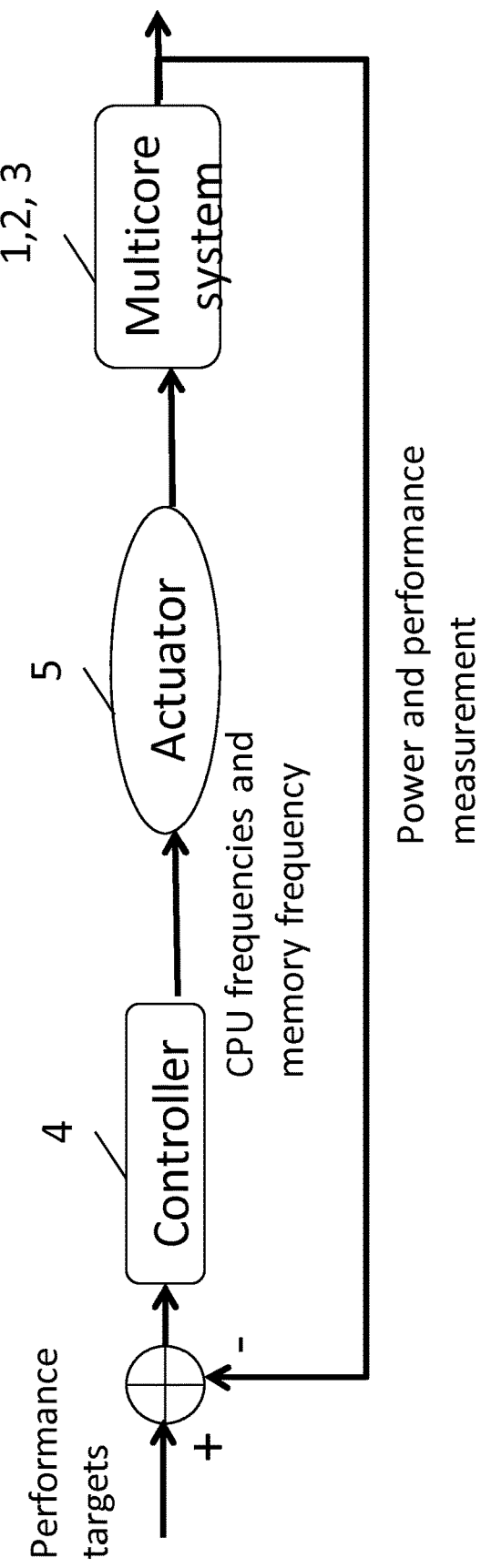
FIG. 2 illustrates a block diagram of a control circuit included in the computing system according to an embodiment of the present invention.

Referring now to FIG. 2, a block diagram of a control circuit in the computing system is illustrated, according to an embodiment of the present invention. The output of the feedback controller 4 is supplied to an actuator 5 which converts the optimal frequency values into control signals for the respective clocks applied to the multicore processor 1 and the main memory 2. The performance feedback from the applications and the power measurement feedback from the power supply 3 is forwarded to the feedback controller 4, wherein a deviation of the current performance measures from target performance measures is determined, the deviation preferably is compensated in the next one or more control steps of the feedback controller 4.

Figure 3:
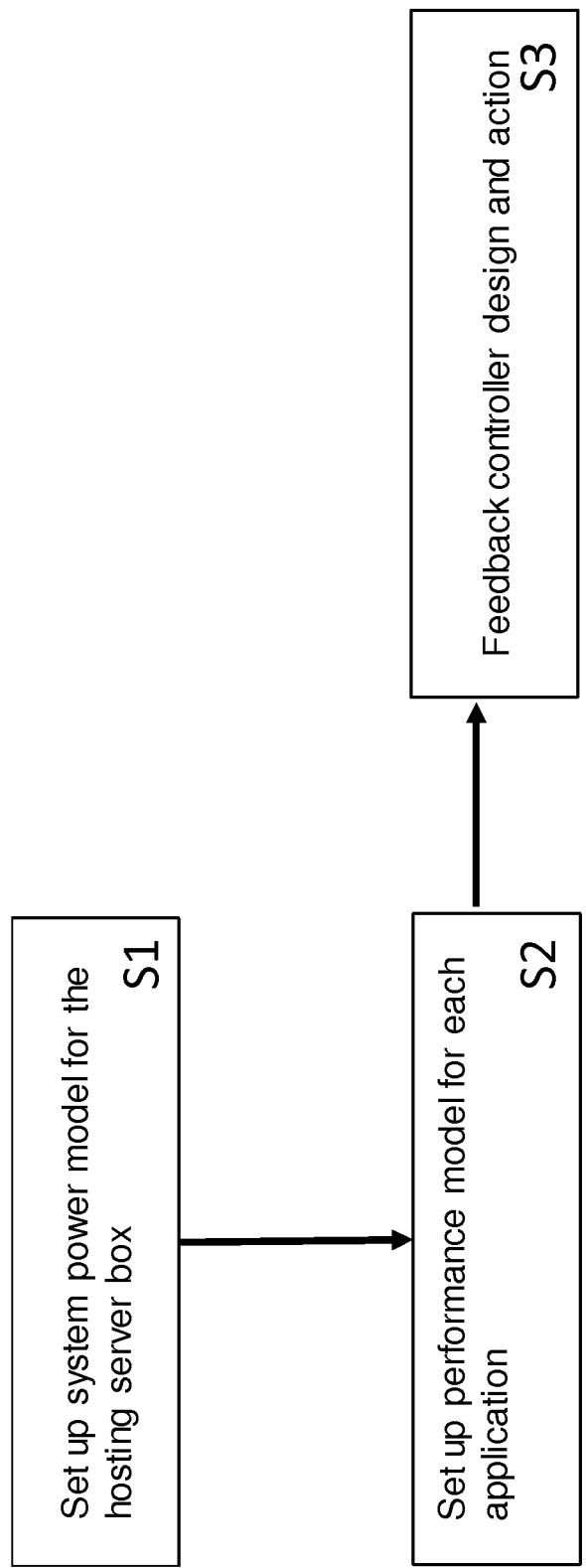
FIG. 3 illustrates a flowchart of a method according to an embodiment of the present invention.

Referring now to FIG. 3 a flowchart of a method is illustrated, according to an embodiment of the present invention. In step S1, a system power model for a hosting server box as computing system is set up. In a preferred embodiment, the system power model is built as a linear function of CPU and memory frequencies. In step S2, for each application, a performance model is set up, preferably as a linear function of CPU and memory frequencies. In addition, performance targets are set for each application. In step S3, the feedback controller receives newly an observed power consumption measure and newly observed performance measurements per application as input, and solves an optimization problem which minimizes a weighted sum of power consumption and performance degradation. Resulting frequencies determined for the cores and the main memory are translated into control actions in a first time slot of an optimization window, for example, into discrete DVFS states, and are applied to the computing system. Then, the optimization window is moved forward.

Summarizing, application-level quality of service (QoS) and fairness amongst applications in a multicore processor environment are achieved wherein fairness is defined as performance degradation proportional to a target performance measurement.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computing system comprising:
one or more multicore processors, wherein each multicore processor comprises a set of one or more processing units, wherein each processing unit is operable at a variable frequency;
a main memory, wherein the main memory is operable at a variable frequency; and
a feedback controller, wherein the feedback controller is configured to control the variable frequency of a processing unit of the set of one or more processing units,
wherein the feedback controller is configured to operate a first predictive model of performance measurement for a first application by determining a first application specific performance measurement dependent on
a sum of weighted linear frequencies of a first subset of the one or more processing units which the first application is supposed to run on, and a weighted linear frequency of the main memory,
wherein the feedback controller is configured to control the variable frequency of each processing unit of the first subset and control the frequency of the main memory, wherein the feedback controller determines the frequency of each said processing unit of the first subset and the main memory from a minimized value of a weighted sum of power consumption of the first subset and a first performance degradation of the first application,
wherein the first performance degradation of the first application is defined as a deviation of the first application specific performance measurement from the first predictive model of performance measurement.

2. The computing system according to claim 1, wherein the feedback controller is configured to control the variable frequency of each processing unit of the set of processing units, and the variable frequency of the main memory is dependent on the determined measurement.

3. The computing system according to claim 1, further comprising a power supply providing power to at least one of the one or more multicore processors and to the main memory,
wherein the feedback controller is configured to control the variable frequency of each processing unit of the set of one or more processing units and the variable frequency of the main memory, in addition the feedback controller is dependent on a measurement representative of a current power supplied by the power supply.

4. The computing system according to claim 1, wherein the feedback controller is configured to operate a predictive model of power consumption by determining a consumed power, the consumed power is dependent on the variable frequencies of each processing unit of the set of one or more processing units and the variable frequency of the main memory.

5. The computing system according to claim 4, wherein in the predictive model of power consumption, the consumed power is determined by adding weighted linear frequencies of the processing units of the set of one or more processing units and a weighted linear frequency of the main memory.

6. The computing system according to claim 1, wherein the feedback controller is configured to operate a predictive model of performance measurement for each application by determining an application specific performance measurement dependent on the frequencies of the processing units of the set of one or more processing units the application is supposed to run on and dependent on the frequency of the main memory.

7. The computing system according to claim 1, wherein the feedback controller is configured to determine the frequency of each processing unit of the set of one or more processing units by which said processing unit is to be controlled in a next step and the frequency of the main memory by which the main memory is to be controlled in a next step by respecting at least one target of performance measurement provided for each application.

8. The computing system according to claim 1, wherein the feedback controller includes a Model Predictive Controller.

9. The computing system according to claim 1,
wherein the feedback controller is configured to operate a set of predictive models of performance measurements for corresponding set of applications by determining a set of predictive application specific performance measurements dependent on a sum of weighted linear frequencies of a corresponding subset of one or more processing units the corresponding application is supposed to run on, and a weighted linear frequency of the main memory,
wherein the feedback controller is configured to control the variable frequency of each processing unit of the set of one or more processing units and control the frequency of the main memory by minimizing a weighted sum of power consumption of the of each processing unit of the set of one or more processing units and a set of performance degradations corresponding to the set of applications.

10. A method for operating a computing system comprising:
one or more multicore processors with a set of multiple processing units each operable at a variable frequency, comprising a main memory operable at a variable frequency, and comprising a power supply providing power at least to the one or more multicore processor and to the main memory, the method comprising:
providing a predictive model of performance measurement of a current performance of a respective application, for each application of a set of applications co-running on the set of multiple processing units, wherein the measurement is dependent on a sum of weighted linear frequencies of a correspond subset of the multiple processing units which the corresponding application is supposed to run on, and a weighted linear frequency of the main memory;
providing a power measurement representative of a current power supplied by the power supply; and
controlling via a feedback controller, the frequency of each processing unit of the set of multiple processing units and the frequency of the main memory, wherein the feedback controller determines the frequency of each said processing unit of the set of multiple processing units and the frequency of the main memory from a set of deviations between a weighted sum of the predictive models of performance measurements of each application of the set of applications co-running and the power measurement.

11. The method according to claim 10, comprising:
operating a predictive model of power consumption by determining a consumed power dependent on the frequencies of each said processing unit and dependent on the frequency of the main memory; and
operating a predictive model of performance measurement for each application of the set of applications co-running by determining an application specific predictive model of performance measurement dependent on the frequencies of the processing units the application is supposed to run on and the frequency of the main memory.

12. The method according to claim 11, comprising:
determining the frequency to control each processing unit of the set of multiple processing units within a next step and determining the frequency to control the main memory within a next step by minimizing a weighted sum of power consumption and performance degradation per application of a set of applications co-running wherein the performance degradation per application is defined as a deviation of the performance measurement from the predictive model of performance measurement.

13. The method according to claim 10, wherein determining the frequency for each processing unit of the set of multiple processing units and the frequency of the main memory is calculated by applying a Model Predictive Controller.

14. A computer program product for operating a computing system, the computer program product comprising:
one or more multicore processors with a set of multiple processing units each operable at a variable frequency, comprising a main memory operable at a variable frequency, and comprising a power supply providing power at least to the one or more multicore processors and to the main memory;
one or more non-transitory computer readable storage media and program instructions stored on the one or more computer-readable storage media, the program instructions comprising:
program instructions to provide a predictive model of performance measurement representative of a current performance of respective application, for each application of a set of applications co-running on the set of processing units, wherein the measurement is dependent on a sum of weighted linear frequencies of a correspond subset of the multiple processing units which the corresponding application is supposed to run on, and a weighted linear frequency of the main memory;

program instructions to provide a power measurement representative of a current power supplied by the power supply; and program instructions to control via a feedback controller, the frequency of each processing unit of the set of multiple processing units and the frequency of the main memory, wherein the feedback controller determines the frequency of each said processing unit of the set of multiple processing units and the frequency of the main memory from a set of deviations between a weighted sum of the predictive models of performance measurements of each application of the set of applications co-running and the power measurement.

15. The computer program product according to claim 14, further comprising:

program instruction to operate a predictive model of power consumption by program instructions to determine a consumed power dependent on the frequencies of each said processing unit and dependent on the frequency of the main memory; and program instructions to operate a predictive model of performance measurement for each said application by program instructions to determining the application specific predictive model of performance measurement dependent on the frequencies of the processing units the application is supposed to run on and the frequency of the main memory.

16. The computer program product according to claim 15, further comprising:

program instructions to determine the frequency to control each said processing unit within a next step and program instructions to determine the frequency to control the main memory within a next step by program instructions to minimize a weighted sum of power consumption and performance degradation per application wherein the performance degradation per application is defined as a deviation of the performance measurement from the predictive model of performance measurement.

17. The computer program product according to claim 14, wherein program instructions to determine the frequency for each said processing unit and the frequency of the main memory by is calculated by applying a Model Predictive Controller.

\* \* \* \* \*